Jan. 21, 1969

J. R. CRABB 3,422,987

BULK STORAGE FRUIT-VENDING MACHINE

Filed April 5, 1967

INVENTOR
JASPER R. CRABB
BY Robert W. Beach
ATTORNEY

Jan. 21, 1969  J. R. CRABB  3,422,987
BULK STORAGE FRUIT-VENDING MACHINE
Filed April 5, 1967
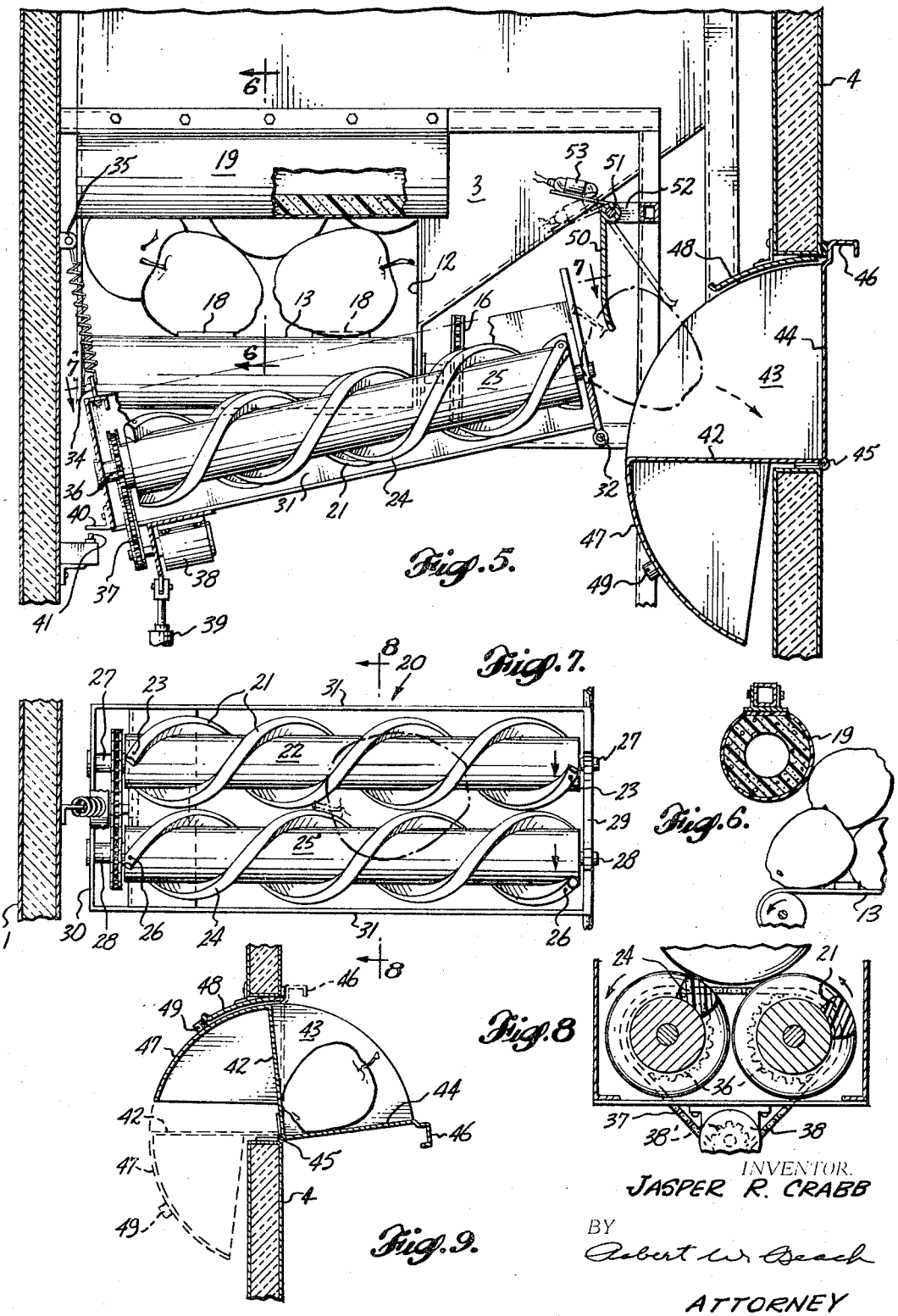
INVENTOR.
JASPER R. CRABB
BY
Robert W. Beach
ATTORNEY

United States Patent Office 3,422,987
Patented Jan. 21, 1969

3,422,987
BULK STORAGE FRUIT-VENDING MACHINE
Jasper R. Crabb, Yakima, Wash. 98902, assignor to Pomona Service & Supply Co., Inc., Yakima, Wash., a corporation of Washington
Filed Apr. 5, 1967, Ser. No. 628,614
U.S. Cl. 221—13   11 Claims
Int. Cl. G07f 11/44

ABSTRACT OF THE DISCLOSURE

Cooled air is circulated through the bulk storage compartment to maintain the fruit at a desired cold storage temperature. From the bottom of such compartment a layer of fruit is removed by a belt forming the bottom to the compartment. Such conveyor moves units of fruit through a passage, which is yieldingly restricted in height to provide controlled passage of fruit through it onto a singling screw conveyor composed of two rotative helices rotated side by side and inclined upwardly to a dispensing device. Such dispensing device includes a gate past which individual units of fruit move into a dispensing pocket formed by a tilting gate and barrier which move simultaneously so that, as the gate is opened to afford access to the dispensing pocket, the barrier will move into a position blocking access by the customer to the interior of the machine beyond the dispensing pocket. One end of the screw conveyor suspended from a spring moves in response to fruit being supplied to or shifted along the conveyor to actuate a belt-conveyor-controlling switch. The screw conveyor drive is energized by coin-operated mechanism and is de-energized by a mercury switch mounted on an additional barrier swung by a fruit unit moving from the conveyor to the dispensing pocket.

---

The principal object of this invention is to provide a vending machine having a storage compartment of large capacity for storing fruit in bulk instead of storing the fruit in columns or rows and which compartment can be filled quickly and easily.

A further object is to provide such a vending machine which is simple and rugged and which will dispense individual fruit units reliably and without bruising the fruit even though such units may be of considerably different size. An incidental object is to remove individual fruit units from the storage compartment only as needed for dispensing.

In dispensing fruit units it is an object to prevent jamming of the fruit and to prevent more than one unit of fruit from being dispensed at any time. As each unit of fruit is being dispensed, it is an object to prevent access of a customer to the remainder of the fruit within the machine.

Another object is to provide such a vending machine from which successive units of fruit can be dispensed quickly and directly to the customer without being damaged by being dropped, even though the fruit is stored in the machine in random fashion in a bulk storage compartment.

More particularly it is an object to provide a dispensing arrangement for such a bulk machine which will prevent repeated successive dispensing operations of a delivery device without corresponding actuations of coin-operated mechanism if the machine is of the coin-controlled type. Moreover, such a delivery device will be automatically self-sealing after each dispensing operation.

It is also an object to provide such a bulk storage fruit vending machine which is easy to clean internally and which, despite its dispensing capability, will be sealed sufficiently tightly to keep out dust and insects and will even minimize ingress of warm air and egress of cold air, the cabinet being refrigerated.

Figure 2:
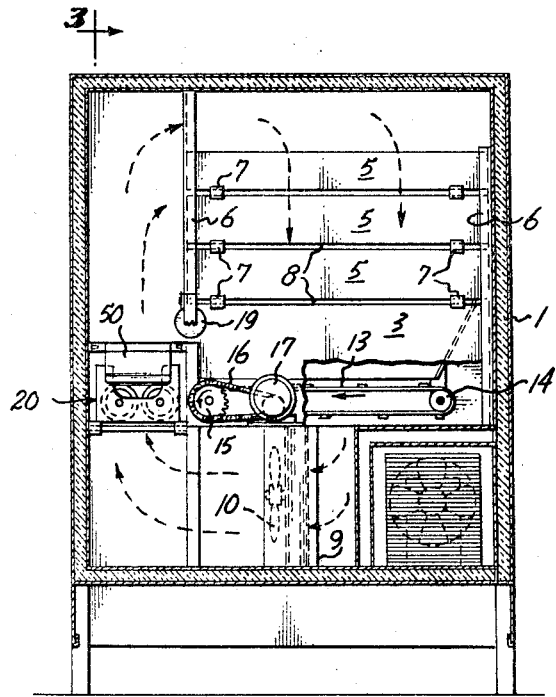
Figure 3:
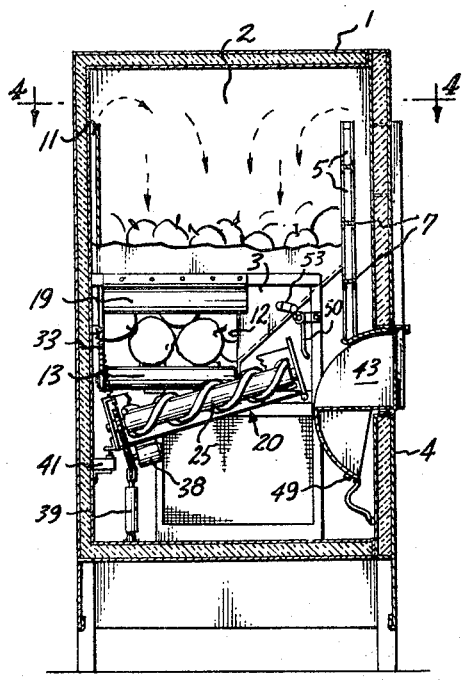
Figure 1:
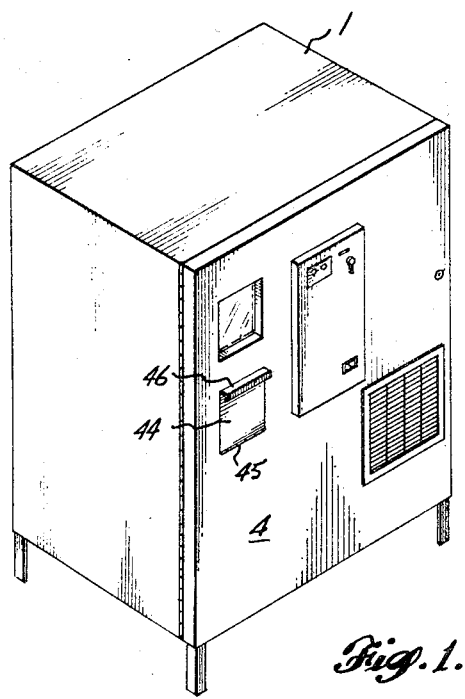
Figure 4:
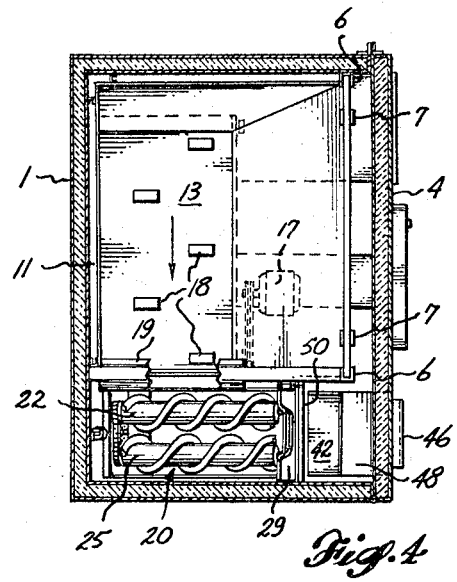

FIGURE 1 is a top perspective of a fruit vending machine viewing its dispensing side.
FIGURE 2 is a vertical section through the machine, and FIGURE 3 is a vertical section through the machine taken on line 3—3 of FIGURE 2.
FIGURE 4 is a horizontal section through the machine on line 4—4 of FIGURE 3.
FIGURE 5 is an enlarged vertical section through the lower portion of the machine on line 3—3 of FIGURE 2 with parts broken away. FIGURE 6 is a detail section on line 6—6 of FIGURE 5. FIGURE 7 is a detail section on line 7—7 of FIGURE 5, and FIGURE 8 is a detail section on line 8—8 of FIGURE 7.
FIGURE 9 is a detail section of the dispensing device similar to that shown at the right of FIGURE 5 but with parts shown in a different position.

The vending machine includes an insulated cabinet 1 the major portion of the interior of which constitutes a fruit storage compartment 2. This storage compartment is larger than a box or carton of fruit from which the storage compartment is to be filled, and such compartment conveniently can have a capacity equal to six bushels or apple boxes. The bottom of this compartment preferably has converging walls 3 so as to form a hopper. The door 4, shown in FIGURES 1 and 3 in particular, can constitute an entire side of the cabinet which can be swung open to provide access to the storage compartment. The side of such compartment adjacent to the door can be closed by individual bin boards 5, the ends of which are held in guide channels 6. These bin boards can be spaced apart elevationally by blocks 7, which either can be loose or can be secured to the lower edges of the respective boards so as to leave air passage slots 8 between the adjacent bin boards.

While in storage the fruit can be cooled to the desired temperature and held at such temperature by blowing cold air over it. Such cold air is supplied by the refrigeration unit 9 located in the bottom of the machine, as shown in FIGURE 2. This refrigeration unit is of conventional type, including a compressor, a condenser and a storage tank from which refrigerant is circulated through the cooling coil through which air is blown by the fan 10. The fan blows the air upward between the insulated outer wall of the cabinet and the wall of the storage bin through spaces 11.

Fruit is dispensed from the bottom of the storage compartment through an opening 12 shown best in FIGURES 3, 4 and 5. Fruit at the bottom of the hopper 3 is moved to such aperture by an endless fruit-discharge belt 13 which occupies the major portion of the floor area of the hopper. Such belt encircles supporting and guide rollers 14 at the opposite ends of its loop, one of which rollers is driven by a sprocket 15, shown in FIGURE 2. Such sprocket is rotated by a drive chain 16 which is driven by a motor 17. On the upper stretch of the belt 13 are cleats 18, each of which preferably is of a length transversely of the belt less than one-half the width of the belt. Two rows of such cleats are shown in FIGURE 4 along opposite side portions of the belt, respectively, with the cleats in the two rows arranged in staggered relationship.

While the proportions of the machine components are not critical, the belt 13 may, for example, be 12 inches wide and the cleats 18 may be two inches long transversely of the length of the belt, three-quarters of an inch wide in the direction of the belt length, and one-quarter of an inch thick. The length of the upper belt stretch exposed in the lower portion of the hopper may be eighteen inches, and adjacent cleats in each row may be spaced apart ten and one-half inches lengthwise of the belt. By making the cleats of somewhat resilient material, such as plastic or rubber, damage to fruit by engagement of the cleats pushing it from beneath the other fruit in the storage bin will be avoided.

It would be undesirable for fruit first deposited in the storage bin to be able to roll out through the discharge opening involuntarily or for an excessive amount of fruit to be forced through such opening by the weight of the fruit in the storage bin when the discharge belt is not moving. The stationary cleats with which fruit in the lowest layer is engaged will deter such fruit from rolling through the discharge opening. To prevent fruit in the second layer from being pushed or rolled through the discharge opening over the fruit in the lowest layer, the opening 12 is of a height less than the combined width of two units of fruit, as indicated in FIGURES 3 and 5.

To enable fruit to be discharged voluntarily through the opening 12, the discharge belt 13 is placed in motion so that the cleats 18 will carry the lowest layer of fruit through the opening. By such belt movement, however, the second layer of fruit resting on the lowest layer will also be moved toward the discharge opening. To avoid damage to the fruit in such second layer while preventing it from moving through the discharge opening 12, the upper side of such opening is formed of a resilient head or cushion 19 made of sponge plastic or rubber, which may be hollow, and which is deformable by a unit of fruit, such as an apple, being pressed against it. This structure, therefore, prevents all fruit from being discharged from the storage compartment involuntarily, and prevents an excessive amount of fruit from ever passing through the opening.

Adjacent to the hopper-discharge aperture 12 is a singling helical conveyor 20 onto which fruit discharged through the aperture 12 is deposited. This conveyor includes two cooperating helices disposed in parallel, side-by-side relationship. One conveyor element is composed of two helical splines 21 twined around a central roller 22 and secured in place by pins or screws 23 attaching the opposite ends of the splines to the core tube 22. The other element is formed by two helical splines 24 being twined around a core tube 25 with the opposite ends of such splines being secured to the tube by pins or screws 26.

As seen best in FIGURE 8 the helical splines 21 and 24 are of generally rectangular cross section, but the inner side of each spline is somewhat concave transversely to fit the periphery of the core tube. The outer side of each spline is rounded convexly to avoid fruit being supported on corners. Also the spline is made of rubber or plastic material so as to be somewhat yielding. Such rubber or plastic may, for example, have a durometer reading of approximately seventy. The splines and, if desired, the tubes also can be made of polyvinyl chloride. Two splines are provided on each of the screw units so that each fruit unit will lodge on the singling conveyor, cradled between splines on the two helical units, as shown in FIGURE 8.

The two tubes 22 and 25 have plugs in their opposite ends carrying stub shafts 27 and 28, respectively, which are rotatively mounted in the opposite ends 29 and 30 of a conveyor frame. Such opposite ends are connected by sides 31 of the frame. Such stub shafts are mounted so that the helical splines of the cooperating screws have adequate clearance but are located close together, as is indicated in FIGURE 7.

The singling screw conveyor frame is floatingly mounted to swing about a pivot 32 supporting one end of the frame, and the opposite end of the frame is suspended by a tension spring 33 connected between a hook 34 on the frame and a lug 35 carried by the cabinet of the machine, as shown best in FIGURE 5. Such spring is of a length and is mounted so that the conveyor slopes upward from its suspended end toward its pivoted end at an angle of approximately 15° and in any event within the range of 10° to 20°. Such angle will, of course, vary in accordance with the load of fruit on the conveyor because the suspending spring 33 will be stretched a greater or lesser amount depending upon such load, which will alter the slope of the conveyor correspondingly.

The purpose of the screw conveyor 20 is to single the fruit units delivered to it from the storage compartment and to move such fruit to a dispensing device in a row. Such movement is effected by rotating the helices 21 and 24 in corresponding directions by connecting drive sprockets 36 on corresponding ends of the tubes 22 and 25 by a chain 37. A motor 38 drives this chain by a sprocket 38' engaged with it.

In order to have units of fruit progress smoothly in single file along the screw conveyor the relationship between the two helices has been found to be important. Such fruit units progress upward toward the discharge end of the conveyor because the helices have left-hand convolutions and are turned in counterclockwise directions when viewed from the discharge end of the conveyor, as indicated by the arrows in FIGURE 8. Thus the upper portions of the helices move away from the aperture 12 in the storage compartment through which the units of fruit are supplied to the conveyor. As shown in FIGURE 8, the helix farther from such aperture in turned somewhat in advance of the helix closer to such aperture. Stated in another way, the leading helix in the direction of movement of the upper portions of the helices is in advance of the trailing helix by a small angle of 5° to 15°. As a result of this phase difference in the two helices the leading helix on which the fruit unit rests is always falling away from the fruit unit, while the trailing helix is approaching the fruit unit and pushing it along.

As each fruit unit is discharged through the bin aperture 12 and is deposited on the upwardly inclined screw conveyor, such screw conveyor tends to swing downwardly about its pivot 32. A dashpot 39 connected between the cabinet and the swinging end of the screw conveyor, as shown in FIGURES 3 and 5, resists abrupt downward movement of the swinging end of the conveyor so that it does not tend to bounce and jostle the fruit. Conversely, as the fruit is moved farther up the incline of the screw conveyor 20 the depressing moment about the pivot of hinge 32 is reduced so that the spring 33 raises the screw conveyor into a more gradually inclined position. The depressing moment on the screw conveyor is further decreased as each fruit unit reaches the upper end of the screw conveyor and is discharged from it.

Downward movement of the swinging end of screw conveyor 20 is limited by engagement of the lug 40 projecting from its swinging end with a switch 41 which controls the energization of motor 17 connected to drive the fruit delivery belt 13. Switch 41 is a normally closed switch, and engagement of bracket 40 with it breaks the circuit of motor 17 so as to interrupt the fruit delivery operation. When the screw conveyor is loaded sufficiently with fruit to swing it downwardly so that the switch 41 is actuated, therefore, no further fruit will be delivered by the conveyor 13 until the conveyor 20 has been cleared sufficiently so that spring 33 will raise its swinging end to enable bracket 40 to clear switch 41.

Fruit discharged from the upper end of the screw conveyor 20 will be deposited in a delivery pocket, the base of which is formed by the platform 42 and the opposite sides of which are formed by substantially semicircular sheets 43. A gate 44 constitutes another wall of the pocket. This entire pocket is swingably mounted by a hinge 45, and swinging of such pocket is facilitated by a handle 46 on the upper edge of the gate 44, which can be pulled to tilt the pocket outward from the position of FIGURE 5 to that of FIGURE 9. In such outwardly swung position the interior of the pocket is readily accessible to a customer so that the apple or other fruit unit can be removed from the pocket.

An arcuate wall 47 joins the portions of the side walls 43 behind the platform 42 both to strengthen and increase the rigidity of the pocket structure and to cooperate with a stationary arcuate shield 48 to decrease access to the interior of the cabinet through the aperture in the wall occupied by the tilting pocket. Outward swinging of the pocket is limited by engagement of a stop knob 49 on the arcuate wall 47 with the edge of the arcuate shield 48, as shown in FIGURE 9. Even though the weight of the fruit on the inner and upper side of the gate 44 may be sufficient to hold the pocket in its outwardly tilted position, as shown in FIGURE 9, the weight of the wall 47 and knob 49 will be sufficient to swing the pocket upward and inward from the position of FIGURE 9 to that of FIGURE 5 as soon as the weight of the fruit unit has been removed from the gate.

A swinging plate 50 depending from a pivot 51 mounted on a bracket 52 is interposed between the upper end of the screw conveyor 20 and the fruit delivery pocket. This plate constitutes a further barrier between fruit carried by the screw conveyor and any slot left between the arcuate wall 47 and the shield 48 before such wall moves into overlapping relationship to such shield. Such plate, therefore, further deters tampering with the delivery mechanism of the machine through the aperture which is formed by opening the gate 44 only partially. This plate further constitutes a control for the operation of the screw conveyor 20, which can be coordinated with coin-operated mechanism. For this purpose a normally open switch 53 is mounted to swing with the plate 50.

The switch 53 and the coin-operated mehcanism can be connected in circuit with the motor 38 driving the screw conveyor. Actuation of the coin-controlled mechanism by deposit of a coin will energize motor 38, the circuit of which can be maintained in operation by a holding relay until a de-energizing relay is energized. As a unit of fruit, such as an apple, is discharged from the upper end of the screw conveyor 20, as illustrated in broken lines in FIGURE 5, such fruit unit will swing the depending plate 50 from the solid-line position into the broken-line position so that the mercury switch 53 will be closed to energize the motor circuit de-energizing relay. The depending plate 50 is swung into this broken-line position only momentarily as the unit of fruit passes it, and the action of gravity will swing the plate back into its solid-line position as soon as the fruit unit passes. Such return movement of the plate will not, however, reenergize the screw conveyor motor 38.

It will be seen, therefore, that as successive coins are deposited to actuate the coin-operated mechanism the motor 38 will be started and will continue to operate until a unit of fruit has been discharged from the upper end of the screw conveyor. The supply of fruit to such screw conveyor will be replenished by upward movement of the swinging end of such conveyor, releasing switch 41 to effect operation of the supply conveyor 13 to deliver fruit from the storage bin until such delivery is terminated by subsequent downward swinging of the screw conveyor 20 to cause lug 40 to open the control switch 41 for motor 17.

I claim as my invention:

1. A fruit-vending machine comprising fruit-dispensing means, singling screw-conveyor means for feeding fruit units one at a time to said fruit-dispensing means, supply means for depositing fruit units on said screw-conveyor means for movement therealong in a row to said fruit-dispensing means, resilient means supporting said singling screw-conveyor means for downward movement in response to deposit of fruit units thereon, and means for energizing said supply means by raising of said singling screw-conveyor means effected by said resilient means upon discharge of fruit from said screw-conveyor means.

2. The fruit-vending machine defined in claim 1, and pivot means near the discharge end of the singling screw-conveyor means supporting the screw-conveyor means for upward and downward swinging of its opposite end.

3. The fruit-vending machine defined in claim 1, and dashpot means connected to the screw-conveyor means for damping elevational movement thereof.

4. The fruit-vending machine defined in claim 1, in which the screw-conveyor means includes two coacting helices disposed in side-by-side relationship and convoluted in the same sense and means for rotating said helices in corresponding directions and at the same speed, the upper side of one helix which turns toward the upper side of the other helix rotatively lagging behind such other helix by a small angle.

5. The fruit-vending machine defined in claim 1, in which the supply means includes a storage compartment having a discharge aperture therein, means for moving fruit units from such storage compartment through such aperture to the singling screw-conveyor means and resilient cushion means forming one edge of such aperture, of a size to deter movement of more than one fruit unit at a time through such aperture and deformable by a fruit unit forced against it to prevent damage to such fruit unit.

6. The fruit-vending machine defined in claim 5, in which the resilient cushion means constitutes the head of the aperture.

7. The fruit-vending machine defined in claim 1, in which the fruit-dispensing means includes a movable pocket and pivot means supporting said pocket for tilting between a position for receiving a fruit unit from the singling screw-conveyor means and a position in which the interior of the pocket is accessible from the exterior of the machine.

8. A fruit-vending machine comprising fruit-dispensing means, and supply means for supplying fruit to said fruit-dispensing means including a storage compartment having a discharge aperture therein, means for moving fruit units from such storage compartment through such aperture to said fruit-dispensing means and non-rotary resilient tubular cushion means forming one edge of such aperture, of a size to deter movement of more than one fruit unit at a time through such aperture and deformable by the localized pressure of a fruit unit forced against it to prevent damage to such fruit unit.

9. A fruit-vending machine comprising a cabinet, fruit-supply means in said cabinet, and fruit-dispensing means receiving fruit from said fruit-supply means and including a movable pocket movable between a position for receiving a fruit unit from said fruit-supply means and a position in which the interior of the pocket is accessible from the exterior of the machine through an opening in said cabinet and having a platform movable to urge the fruit unit toward such opening, and a wall carried by and extending inward from said platform, and, by fruit-dispensing movement of said platform, movable relative to said cabinet to obstruct the cabinet opening so as to deter access to the interior of the cabinet through such opening past said platform.

10. A fruit-vending machine comprising fruit-supply means, fruit-dispensing means receiving fruit from said fruit-supply means, and means for controlling operation of said fruit-supply means including means for initiating operation of said fruit-supply means, a gate engageable by a fruit unit moving from said fruit-supply means to said fruit-dispensing means and a position-actuated switch mounted on said gate and operable to de-energize said fruit-supply means by automatic movement of said gate after the fruit unit has moved out of engagement with said gate.

11. A fruit-vending machine comprising fruit-dispensing means, singling screw-conveyor means for feeding fruit units one at a time to said fruit-dispensing means including two coacting helices disposed in side-by-side relationship and convoluted in the same sense and means for rotating said helices in corresponding directions at the same speed, the upper side of one helix which turns toward the upper side of the other helix rotatively lagging behind such other helix by a small angle, and supply means for depositing fruit units on said screw-conveyor means for movement therealong in a row to said fruit-dispensing means.

(References on following page)

References Cited

UNITED STATES PATENTS

| | | | |
|---|---|---|---|
| 905,401 | 12/1908 | Billmeyer | 221—13 |
| 1,729,886 | 10/1929 | Massie | 221—115 |
| 2,604,371 | 7/1952 | Smiley et al. | 194—10 X |
| 2,719,651 | 10/1955 | Gabrielsen | 221—115 X |
| 2,787,358 | 4/1957 | Cox | 198—104 X |
| 2,927,715 | 3/1960 | Lux | 221—251 X |

STANLEY H. TOLLBERG, *Primary Examiner.*

U.S. Cl. X.R.

198—104; 221—237, 251